United States Patent [19]

Stover et al.

[11] Patent Number: 5,198,948

[45] Date of Patent: Mar. 30, 1993

[54] SHIELDED SERVO HEADS WITH IMPROVED PASSIVE NOISE CANCELLATION

[75] Inventors: Lance E. Stover, Minnetonka; Beat G. Keel, Prior Lake; John Bortins, Bloomington; Gerald L. Weispfenning, St. Paul, all of Minn.

[73] Assignee: Seagate Technology, Inc., Scotts Valley, Calif.

[21] Appl. No.: 622,558

[22] Filed: Dec. 5, 1990

[51] Int. Cl.⁵ ............................................. G11B 5/17
[52] U.S. Cl. ..................................... 360/124; 360/126; 360/127; 360/110
[58] Field of Search ............... 360/124, 126, 127, 110, 360/123, 125, 122, 97.01

[56] References Cited

U.S. PATENT DOCUMENTS

| | | | |
|---|---|---|---|
| 4,750,071 | 6/1988 | Kato et al. | 360/124 |
| 4,758,917 | 7/1988 | Gooch | 360/124 |
| 4,979,064 | 12/1990 | Mage et al. | 360/126 |

FOREIGN PATENT DOCUMENTS

| | | | |
|---|---|---|---|
| 62-117120 | 5/1987 | Japan | 360/124 |
| 62-157317 | 7/1987 | Japan | 360/124 |

*Primary Examiner*—Stuart S. Levy
*Assistant Examiner*—Alfonso Garcia
*Attorney, Agent, or Firm*—Kinney & Lange

[57] ABSTRACT

A servo head in a disk file data storage system includes at least one shield which acts to block radiation emanating from a nearby data head and thus reduce noise induced in the servo head. The shield is located on either side of an essentially flat conducting coil in a servo transducer, or a data transducer or both. The shield may be either a single layer of material or multiple layers.

21 Claims, 8 Drawing Sheets

DATA TRANSDUCER WRITE CURRENT

Fig. 4B
PRIOR ART

NOISE INDUCED IN SERVO TRANSDUCER

SHIELDED SERVO HEADS WITH IMPROVED PASSIVE NOISE CANCELLATION

BACKGROUND OF THE INVENTION

This invention relates to servo heads in disk file data storage systems. In particular, the present invention relates to improved passive noise cancellation in the servo heads by the use of shielding of servo heads, data heads, or both.

Disk file data storage systems contain magnetic media disks on which data is stored in concentric tracks by means of data heads which write and read magnetically encoded data. These data heads are mechanically linked to a servo head located on an electromechanical actuator. The servo head and the actuator are part of a negative feedback, closed loop servo system which is used to move the data heads (and the servo head) from one track to another for track seek operations and to hold them directly over a track for track following.

The normal output signal of the servo head is encoded radial position information, which it reads from the servo disk. However, the servo head can also pick up external electromagnetic radiation. The main source of this external electromagnetic radiation is the data head located across from the servo head. When that data head is writing data, it is also radiating noise to the servo head. The noise corrupts the normal radial position information for the servo system, thus reducing the track following precision. Consequently, the data written at that time may not be completely within the actual data track boundaries. Later, when this data is being read, the normal track following precision has returned. However, the data head is then flying within the track boundaries trying to read data which may not be written completely within the track boundaries. This increases the probability that data errors will occur during reading.

One prior art technique for canceling signals induced in the servo transducer by electromagnetic radiation emanating from the adjacent data transducer is to use a reverse wound bucking transducer. A bucking transducer can be mounted on the servo head and connected to the servo transducer in either a series-opposing or parallel-opposing configuration. The noise induced in the bucking transducer (which is generated by the adjacent data head when it is writing data) tends to cancel similar noise which is induced in the servo transducer.

SUMMARY OF THE INVENTION

The present invention further improves passive noise cancellation in servo heads of a disk file storage system. The present invention is based upon a recognition of limitations in the passive noise cancellation technique which uses a bucking transducer.

First, the difference in distances of the servo transducer and bucking transducer from the data transducer of the data head can limit the effectiveness of the passive noise cancellation. Although the difference in distance is small (typically 0.015 inches is enough to cause up to 20% difference in the amplitude of noise induced in the two transducers. Because the bucking transducer is more distant from the data transducer than the servo transducer, lower amplitude noise is induced in the bucking transducer. This results in incomplete cancellation of noise from the servo output signal. In addition, as the space between disks is decreased, the difference in distance between the servo and bucking transducers and the data transducer becomes even more pronounced.

Second, although the bucking transducer is recessed slightly from the disk surface, it can still read signals from certain types of servo track patterns. In particular, the bucking transducer has been found to be responsive to signals from the edges of gap fields which are found in sectored servo tracks. Examples of gap fields are index fields that are blank in every sector but one per revolution, and track ID fields that are essentially blank for certain digital track ID codes. These are low spatial frequency structures which are more readily picked up by the recessed bucking transducer. The flux produced at the edges of gap fields induces a low amplitude read signal in the bucking transducer. This read signal corrupts the servo output signal and decreases the accuracy and precision of position information used by the servo system.

Third, inclusion of a bucking transducer in the servo head entails considerable manufacturing cost. Integrated thin film manufacturing techniques, commonly used to manufacture these transducers, require expensive mask sets and production in costly semiconductor manufacturing facilities. Provisions must be made for mounting the bucking transducer on the servo head and electrically connecting it to the servo transducer.

The present invention increases track following precision and accuracy of the servo system by shielding the servo head, data head, or both to substantially block electromagnetic radiation emanating from the data head.

In order to implement noise cancellation, the data transducer or the servo transducer or both are essentially shielded. In one preferred embodiment, two shields essentially surround the particular transducer or transducers. These shields block extraneous electromagnetic radiation from reaching the servo transducer coils and reduce the amount of energy radiated by the data transducer coil.

Thin film transducers are essentially flat, and this makes it possible to shield the transducer coils with two thin flat shields positioned on either side of the transducer. In one preferred embodiment, the shields have approximately the same surface area as the transducer coil and can be manufactured integrally with the transducer using standard thin film processing techniques such as lamination.

DETAILED DESCRIPTION OF THE PREFERRED EMBODIMENTS

Figure 1:
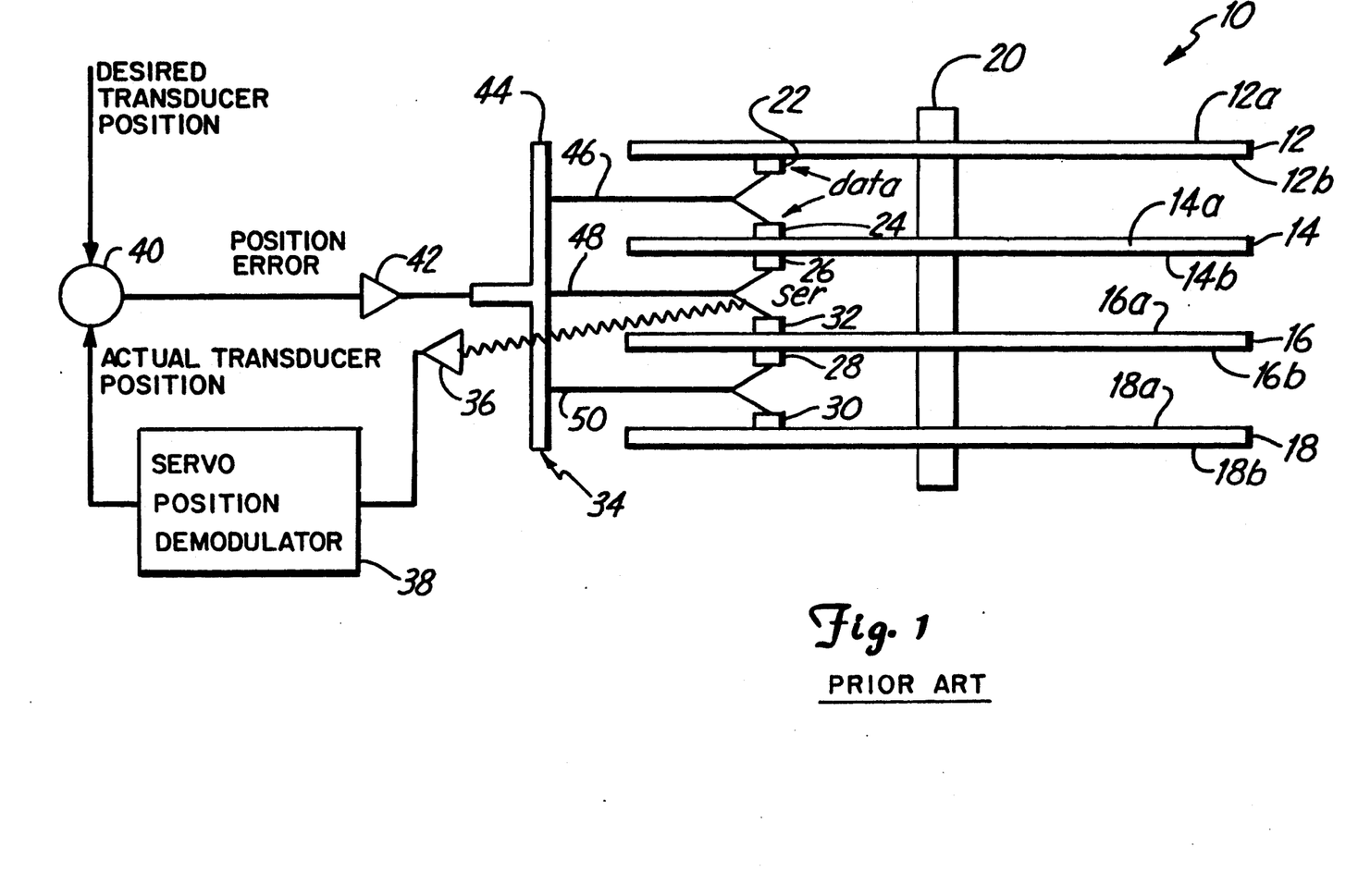
FIG. 1 is a block diagram of a servo system of a rotating disk data storage system.

FIG. 1 shows a disk file data storage system 10 which includes magnetic disks 12, 14, 16 and 18 which are mounted on spindle 20. In the embodiment shown in FIG. 1, data head 22 writes data to and reads data from lower surface 12b of disk 12. Data head 24 reads data from and writes data to upper surface 14a of disk 14, while data head 26 reads data from and writes data to lower surface 14b of disk 14. Data head 28 reads data from and writes data to lower surface 16b of disk 16, and data head 30 reads data from and writes data to upper surface 18a of disk 18.

The positioning of data heads 22, 24, 26, 28 and 30 is controlled by a servo system which includes servo head 32, actuator 34, servo read amplifier 36, servo position demodulator 38, position error signal generator 40, and actuator driver 42. In this particular embodiment, actuator 34 includes an actuator spindle 44 and three actuator arm assemblies 46, 48, and 50. Data heads 22 and 24 are supported by flex arms at the distal end of actuator arm assembly 46. Data head 26 and servo head 32 are supported by flex arms at the distal end of actuator arm assembly 48. Data heads 28 and 30 are supported by flex arms at the distal end of actuator arm assembly 50.

Servo head 32 is positioned adjacent upper surface 16a of disk 16. This upper surface 16a acts as the servo disk surface, and has stored track information which is read by servo head 32 and supplied to servo read amplifier 36 and then to servo position demodulator 38. Servo position demodulator 38 produces an actual transducer position signal based upon information read by servo head 32. The actual transducer position signal is compared to a desired transducer position signal, and a position error signal is generated by position error signal generator 40. The position error signal is supplied through servo driver 42 to control operation of actuator 34. The servo system shown in FIG. 1 provides a negative feedback, closed loop control so that the data heads are moved generally in a radial direction with respect to disks 12, 14, 16 and 18 in order to move the data heads to a desired track during a track seek operation, and to hold the data heads over the desired track during a reading or writing operation.

Figures 2, 2A:
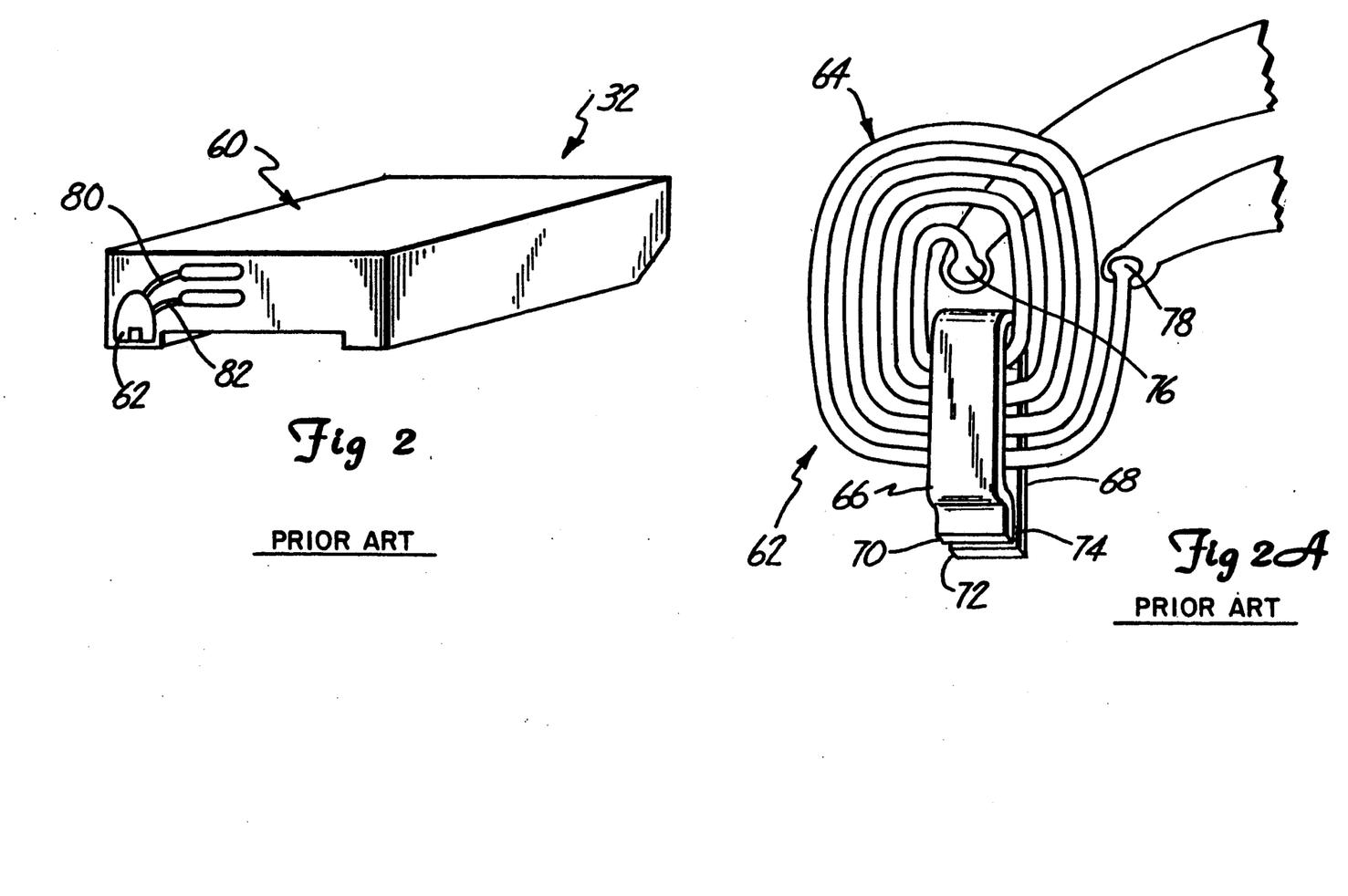
FIG. 2 is a perspective view of a typical servo or data head with a thin film magnetic transducer.
FIG. 2A is a diagrammatic view of a thin film transducer of the type shown in FIG. 2.

In the preferred embodiments of the present invention, data heads 22, 24, 26, 28 and 30, and servo head 32 use thin film magnetic transducers which are typically less than approximately 5 mils thick. FIG. 2 shows a typical prior art servo head, which includes slider 60 and thin film transducer 62. The construction of the servo and data heads is generally similar.

Transducer 62 is shown in further detail in FIG. 2A. Basically, transducer 62 includes a flat coiled conductor 64 and upper and lower pole pieces 66 and 68 which are formed in a U or horseshoe configuration. Upper and lower pole pieces 66 and 68 terminate in a pair of pole tips 70 and 72 with a gap 74 between them. Opposite ends 76 and 78 of coil conductor 64 are connected to transducer terminals 80 and 82, respectively. External leads can be connected to transducer terminals 80 and 82.

The pole pieces 66 and 68 loop through coil 64, and pole tips 70 and 72 are oriented toward the disk surface. As the disk spins, the pole tips link the low level magnetic flux of the track with the coil 64, thus generating an output voltage signal.

Figure 3:
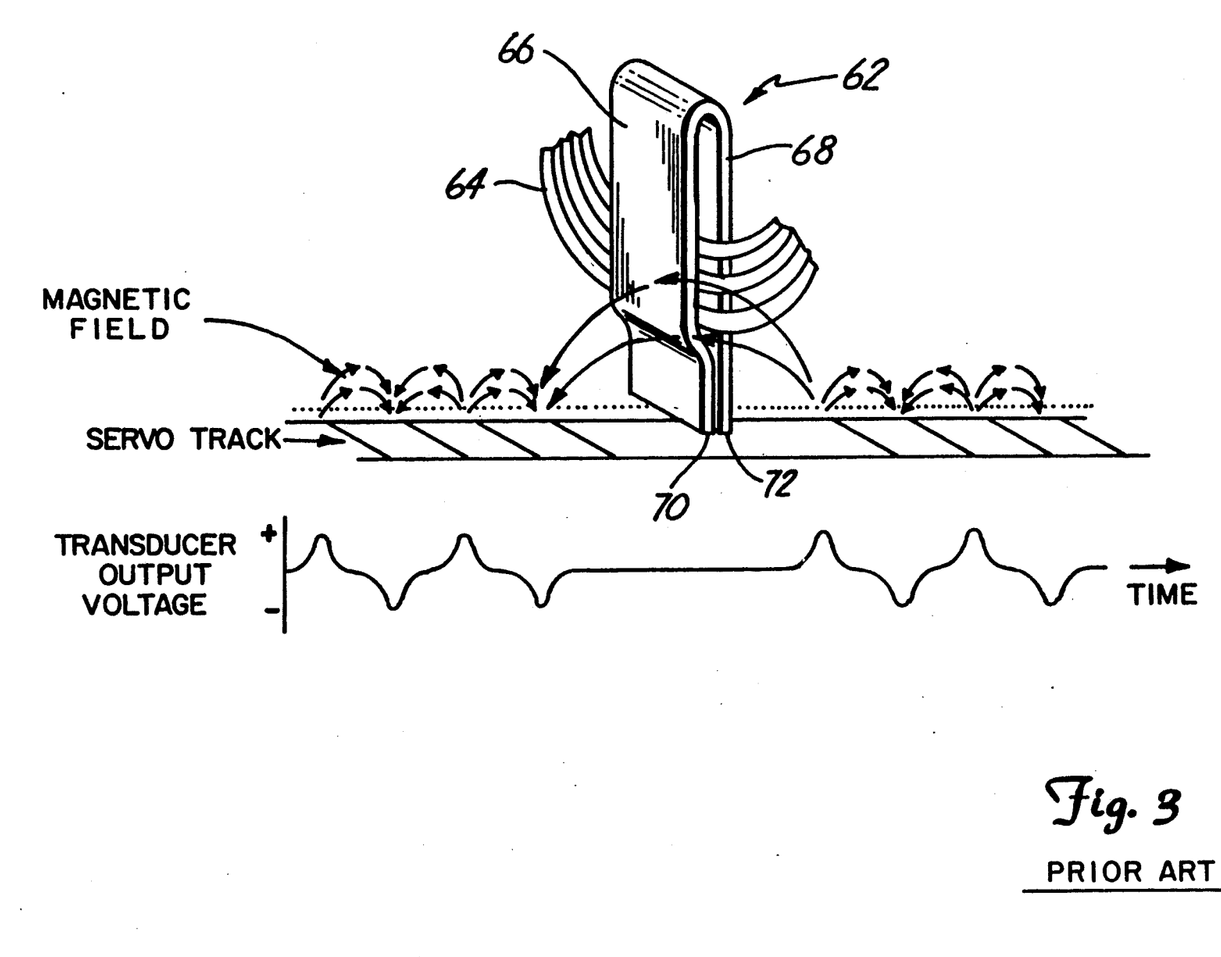
FIG. 3 is a diagram showing the relationship of the transducer to the track and to the transducer output signal.

FIG. 3 shows the operation of servo transducer 62 as a servo track on upper surface 16a of disk 16 moves relative to transducer 62. In FIG. 3, the transducer output voltage, which is derived from transducer terminals 80 and 82, is shown as a function of time as the servo track moves past pole tips 70 and 72.

The primary source of undesired electromagnetic radiation to the servo transducer 62 of servo head 32 is data head 26 which shares the same actuator arm assembly 48 with servo head 32. As shown in FIG. data head 26 and servo head 32 are both located between disks 14 and 16, with data head 26 adjacent lower surface 14b of disk 14, and servo head 32 adjacent upper surface 16a of disk 16. Most of the undesired electromagnetic radiation reaching servo head 32 occurs when data head 26 is writing data.

Figure 4A:
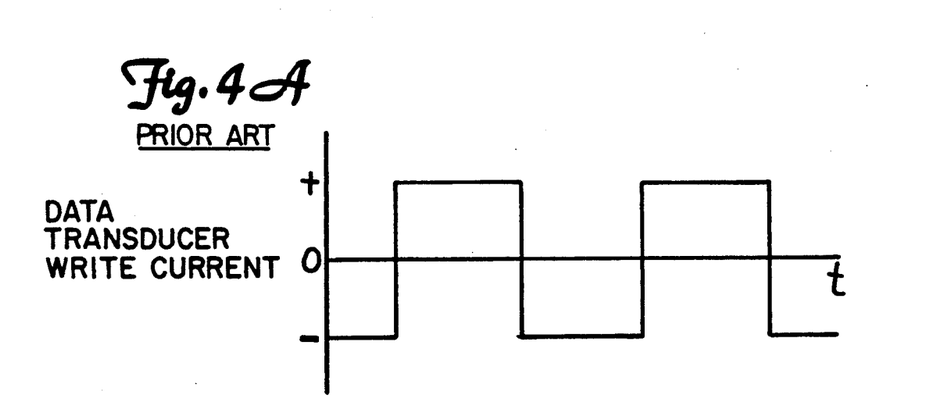
FIGS. 4A and 4B are diagrams showing waveforms of data transducer write current and noise induced in a servo transducer as a function of time to show the relationship of data transducer write current to noise induced in the servo transducer.
Figure 4B:
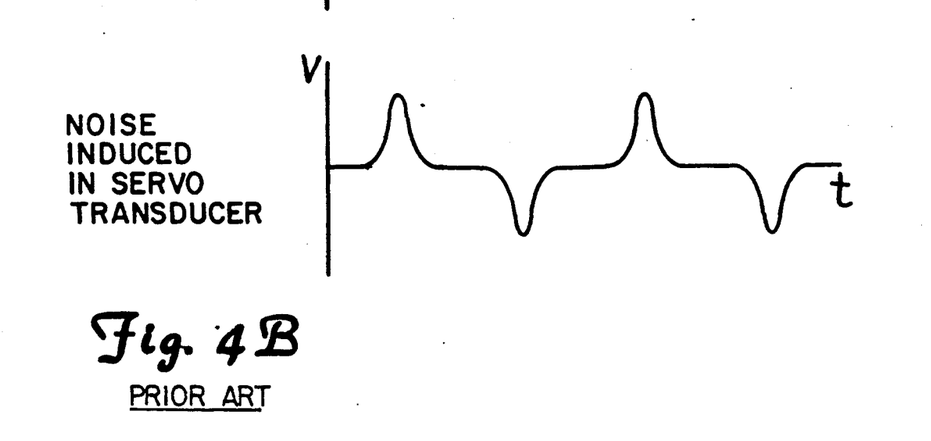
Figure 5:
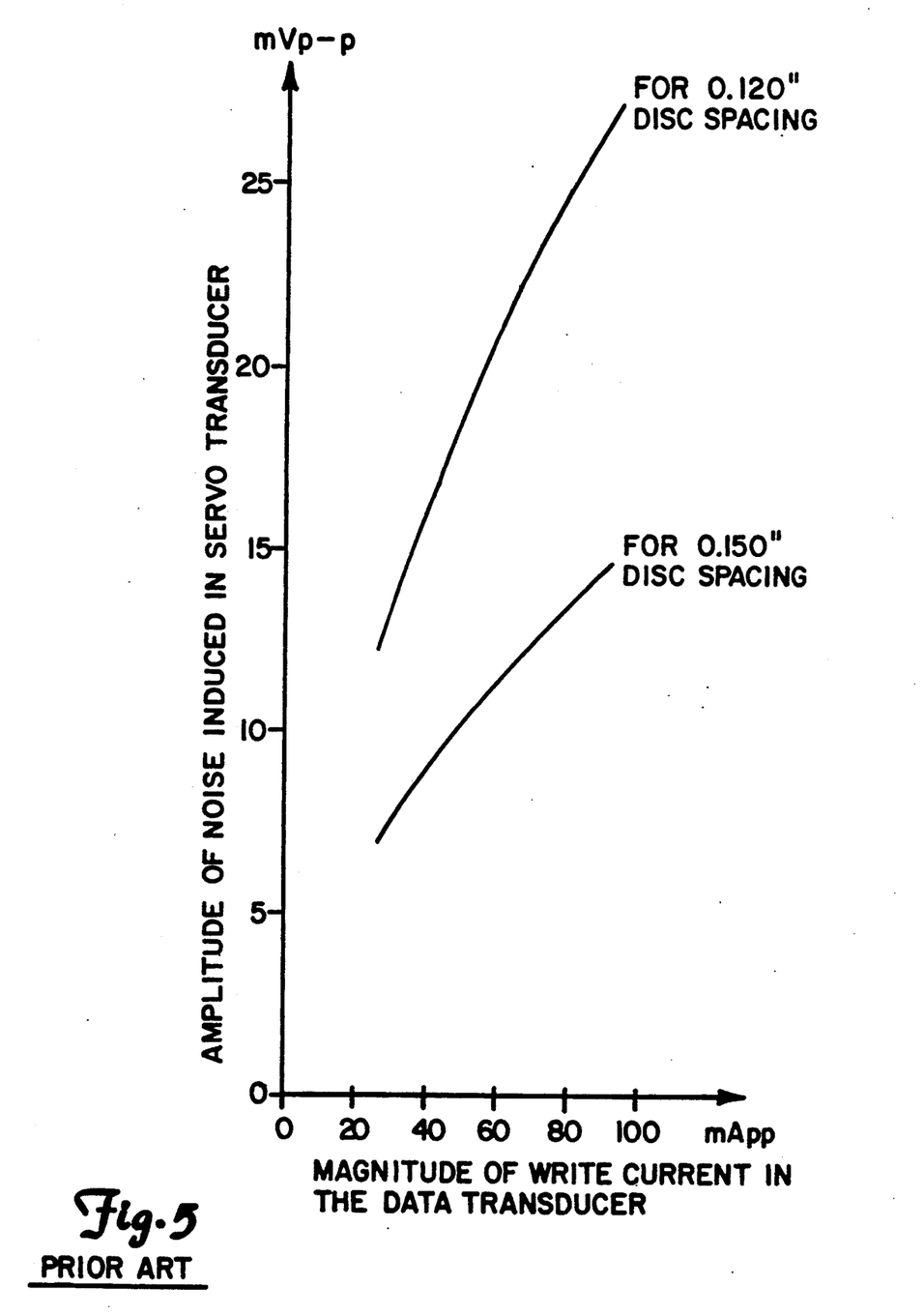
FIG. 5 is a graph showing amplitude of noise induced in a servo transducer as a function of magnitude of write current in the data transducer for two different disk spacings.

FIGS. 4A and 4B illustrate that noise is induced in servo transducer 62 of servo head 32 with each transition in the data transducer write current. The amplitude of the noise induced in servo transducer 62 is proportional to the magnitude of the write current in data head 26, and is related to the rise and fall times of the data transducer's write current (shown generally in FIG. 4A) and to the distance between servo transducer 62 in servo head 32 and the data transducer in data head 26. These effects are illustrated in FIG. 5. The further the servo transducer is located from the data transducer, the lower the amplitude of the noise induced for a given write current.

Figure 6:
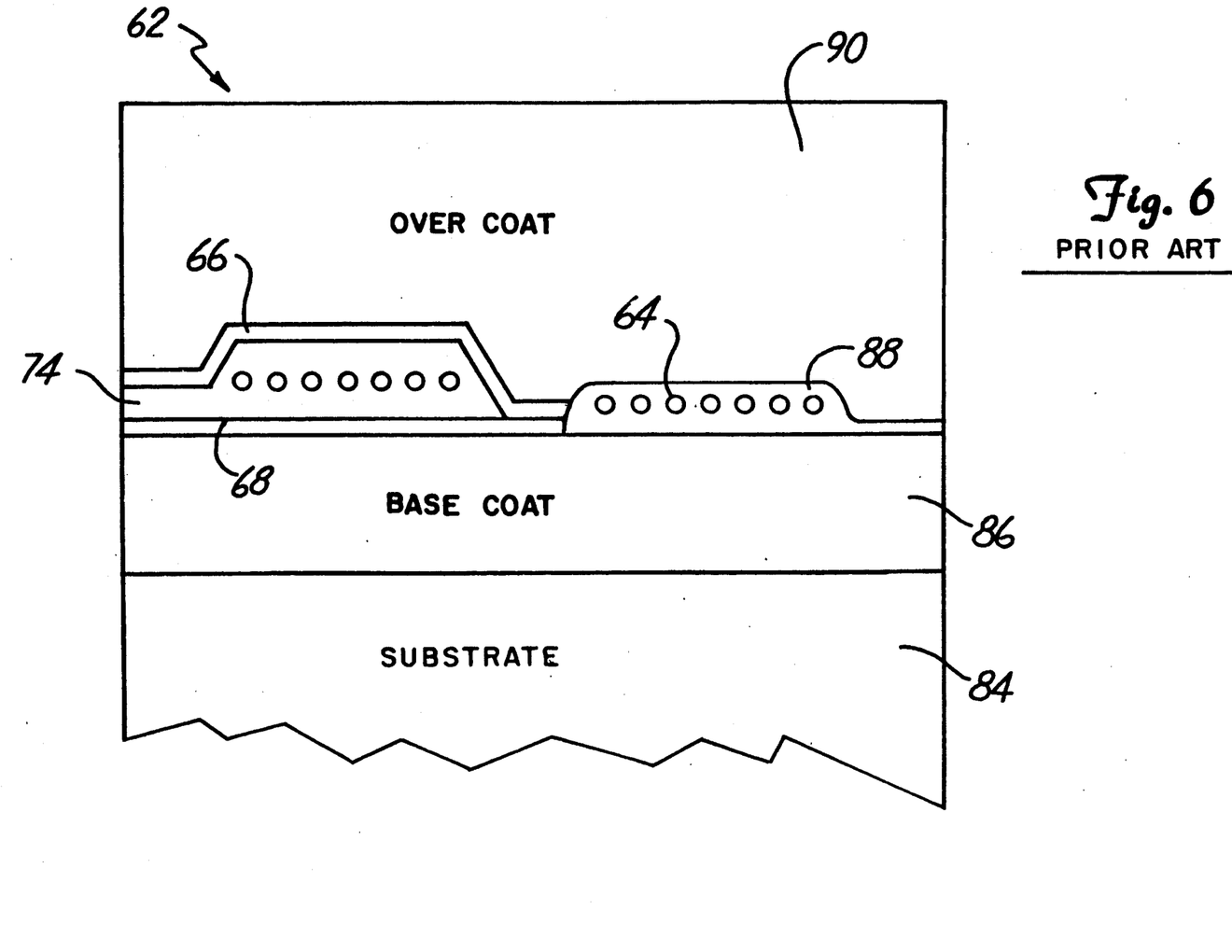
FIG. 6 shows a cross sectional view of the prior art servo transducer of FIGS. 2, 2A and 3.

FIG. 6 illustrates the construction of a prior art servo transducer 62. Shown in side cross sectional view, a base coat 86, which can be made of $Al_2O_3$, separates the transducer coil 64, upper pole piece 66, and lower pole piece 68 from ceramic substrate 84 upon which transducer 62 is fabricated. Ceramic substrate 84, in this preferred embodiment, is formed of aluminum titanate carbide which is commercially available under the name Alsimag. Also, coil conductor 64 is nested inside electrically insulating material 88 which can be photoresist, for example. Since, in prior art transducers, ceramic substrate 84, base coat 86, insulating material 88 and overcoat 90 were typically permeable to electromagnetic radiation, an unwanted electrical signal was induced in coil 64 by electromagnetic radiation emanating from the adjacent data head, in this preferred embodiment data head 26. That portion of coil 64 which is not enclosed by upper pole piece 66 and lower pole piece 68 is particularly exposed to extraneous electromagnetic radiation and prone to picking up unwanted signals.

Figure 7:
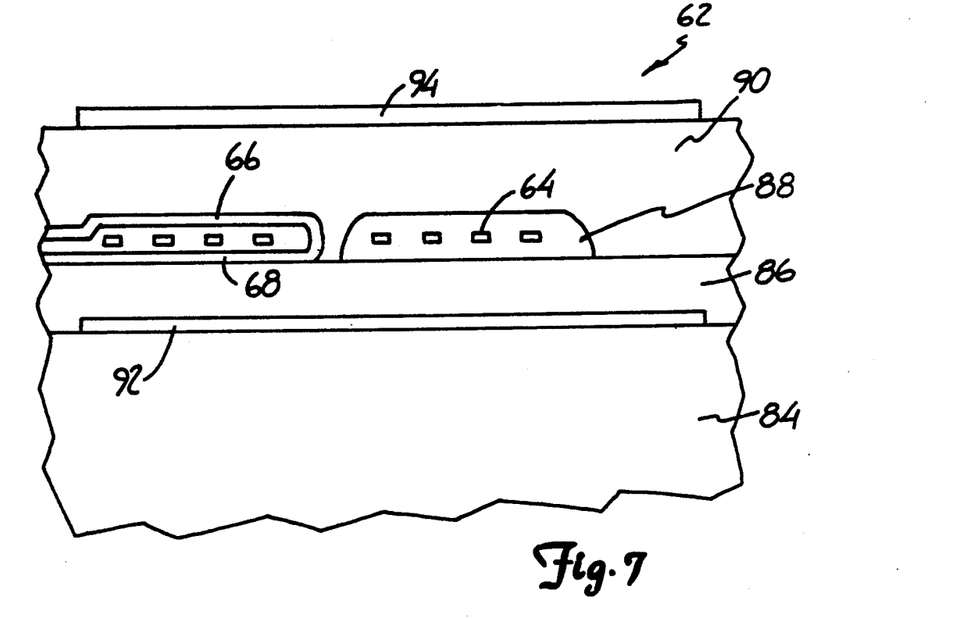
FIG. 7 shows a cross sectional view of one preferred embodiment of the present invention.

One preferred embodiment of the present invention is shown in FIG. 7 in which a transducer is shielded from electromagnetic radiation. It should be noted that the data transducer can be shielded to block extraneous electromagnetic radiation emanating from it, or the servo transducer can be similarly shielded to block extraneous electromagnetic radiation from reaching it, or both the data transducer and the servo transducer can be shielded. The shields, in any of these cases, can be formed in substantially the same manner. However, for ease of reference, this description will continue with reference only to shielding servo transducer 62. Transducer 62 includes lower shield 92 and upper shield 94. Lower shield 92 is typically a planar shield formed of laminated layers of permalloy and gold and is located adjacent base coat 86. Upper shield 94 is also typically a planar shield made of laminated layers of permalloy and gold and is positioned on top of overcoat 90. Upper shield 94 and lower shield 92 are typically between 0.5 $\mu$m and 10 $\mu$m thick. This is generally the needed thickness determined by the strength of the extraneous signal and the electromagnetic blocking capability of the shield material selected. Both lower shield 92 and upper shield 94 are preferrably essentially impermeable to electromagnetic radiation and block extraneous electromagnetic radiation originating outside of transducer 62 from reaching coil conductor 64.

Shields 92 and 94 can be made of any number of suitable materials. Since shields 92 and 94 should shield against both AC noise and noise created by magnetic flux, it is preferred, though not required, that the shields are made of layers of magnetically permeable material and electrically conductive material. Some suitable magnetically permeable materials are NiFe alloys, NiFeCr, and FeCo. Some suitable electrically conductive materials are Cu, Ag and Au. The thickness of each shield is approximately between 5 $\mu$m and 10 $\mu$m.

Figure 8:
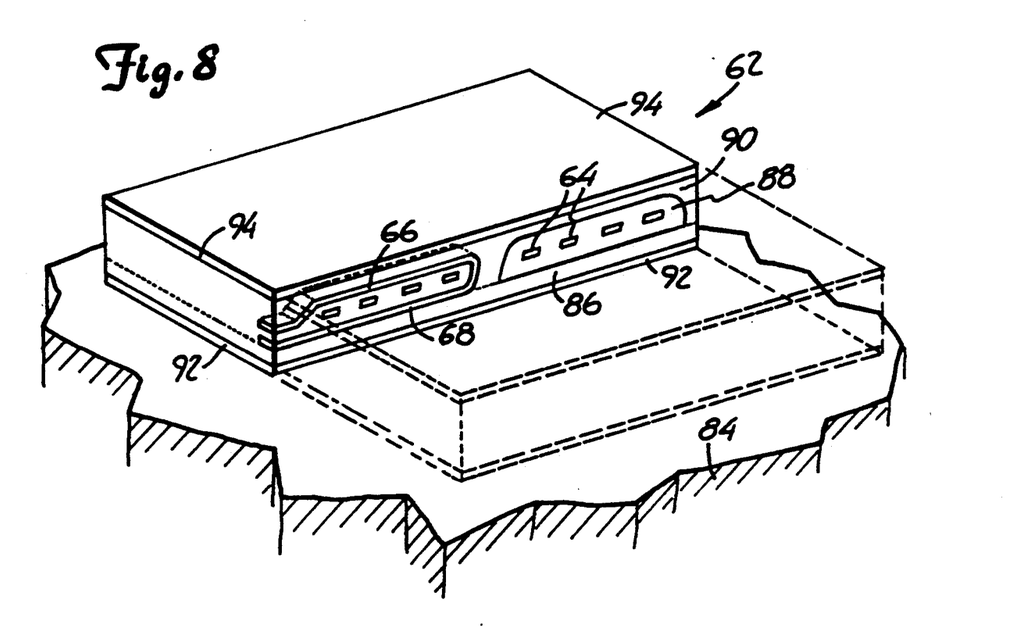
FIG. 8 shows a perspective view of one preferred embodiment of the present invention shown in FIG. 7.

FIG. 8 shows a perspective view of the shielded transducer shown in FIG. 7. The extent to which lower shield 92 and upper shield 94 sandwich coil conductor 64 is illustrated in FIG. 8. In the embodiment shown in FIGS. 7 and 8, it is preferred that shields 92 and 94 extend to substantially cover or sandwich, the entire transducer coil 64.

Figure 9:
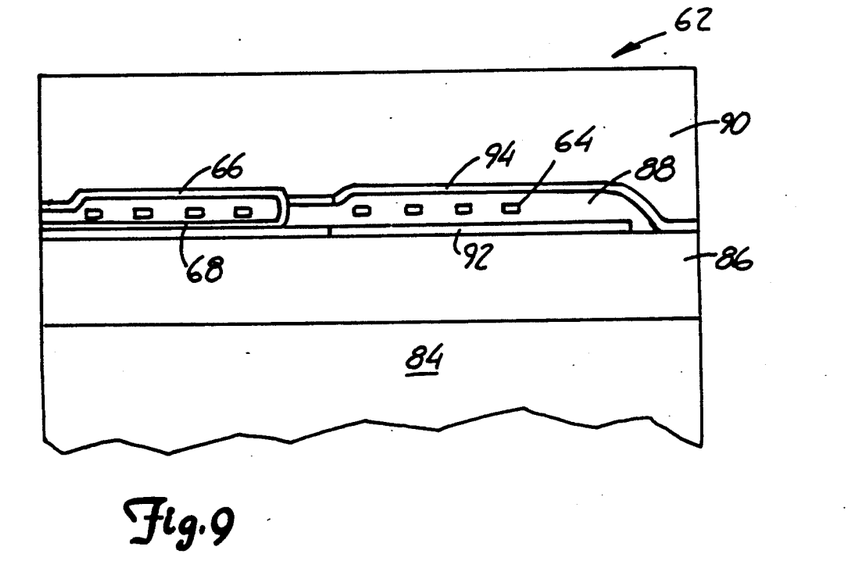
FIG. 9 shows a cross sectional view of a second preferred embodiment of the present invention.

Another preferred embodiment of the present invention is shown in FIG. 9 in which lower shield 92 and upper shield 94 are positioned differently than in the embodiment of FIGS. 7 and 8. FIG. 9 shows a cross sectional view of a transducer 62 having lower shield 92 and upper shield 94 positioned adjacent insulating material 88. In this embodiment of the present invention, the upper and lower shields 92 and 94 extend to essentially completely cover that portion of coil conductor 64 which is not surrounded by pole pieces 66 and 68. As in the embodiment of FIGS. 7 and 8, the shields shown in FIG. 9 act to block extraneous electromagnetic radiation and prevent extraneous radiation from reaching coil conductor 64.

Figure 10:
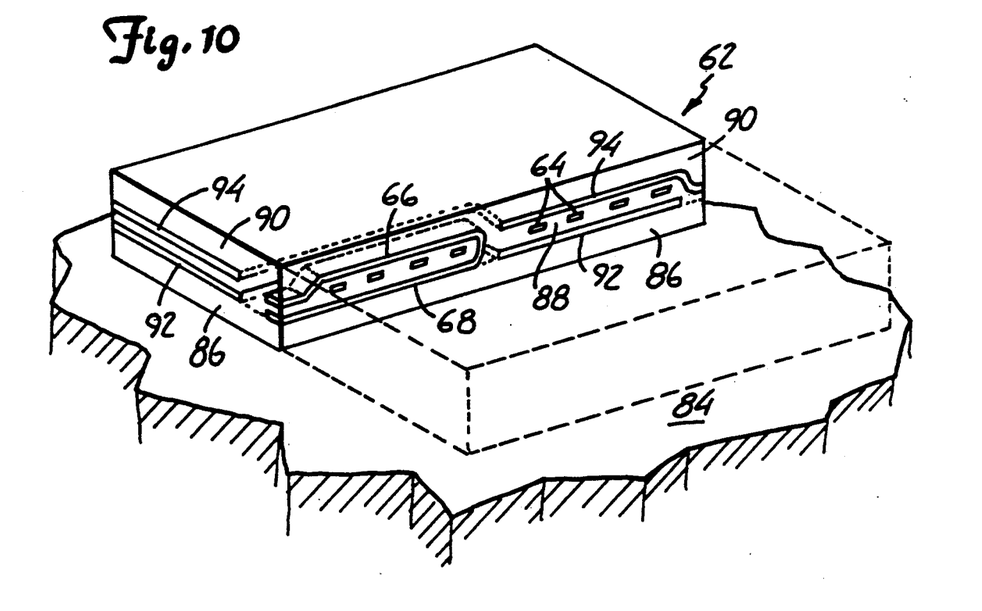
FIG. 10 shows a perspective view of the preferred embodiment of the present invention shown in FIG. 9.

FIG. 10 is a perspective view of the preferred embodiment of the present invention shown in FIG. 9. In FIG. 10, the extent to which lower shield 92 and upper shield 94 cover coil conductor 64 is clearly evident. As in FIG. 8, substantially covers the entire conductor coil 64 is shielded.

The improved noise cancellation provided by the present invention is important because servo head 32 can be placed in the center of the disk stack and still have data head 26 across from it. This permits the utilization of all data disk surfaces, which maximizes the data capacity of the disk drive. In addition, the mechanical and thermal drift tolerance stack-up between the outer data heads and the servo head is minimized. This improves track following accuracy. This also allows the possibility of inclusion of more disks in the disk stack, which again increases overall data capacity.

Although the present invention has been described with reference to preferred embodiments, workers skilled in the art will recognize that changes may be made in form and detail without departing from the spirit and scope of the invention.

What is claimed is:

1. A data storage system, comprising:
    a spindle;
    a first magnetic disk mounted on the spindle for storing data;
    a second magnetic disk mounted on the spindle for storing servo information;
    a data head, positioned between the first and second magnetic disks and adjacent the first magnetic disk, the data head comprising:
        a first slider; and
        a first thin film transducer mounted on the first slider for writing data to and reading data from the first magnetic disk, the first thin film transducer comprising:
            a first essentially planar coil winding having a center and first and second sides;
            a first upper pole piece positioned along and covering a portion of the first side of the first essentially planar coil winding; and
            a first lower pole piece positioned along and covering a portion of the second side of the first essentially planar coil winding, the first lower pole piece joining the first upper pole piece at the center of the first essentially planar coil winding; and
    a servo head, positioned between the first and second magnetic disks and adjacent the second magnetic disk, for producing an output signal as a function of the servo information stored on the second magnetic disk, the servo head comprising:
        a second slider; and
        a second thin film transducer mounted on the second slider for reading servo information from the second disk, the second thin film transducer comprising:
            a second essentially planar coil winding having a center and first and second sides;
            a second upper pole piece positioned along and covering a portion of the first side of the second essentially planar coil winding;
            a second lower pole piece positioned along and covering a portion of the second side of the second essentially planar coil winding, the second lower pole piece joining the second upper pole piece at the center of the second essentially planar coil;
            a first shield covering a portion of the first side of the second essentially planar coil winding not covered by the second upper pole piece; and
            a second shield covering a portion of the second side of the second essentially planar coil winding not covered by the second lower pole piece.

2. The data storage system of claim 1 wherein the first shield also covers the second upper pole piece.

3. The data storage system of claim 2 wherein the second shield also covers the second lower pole piece.

4. The data storage system of claim 1 wherein the first thin film transducer of the data head further comprises:
    a third shield covering a portion of the first side of the first essentially planar coil winding not covered by the first upper pole piece; and a fourth shield covering a portion of the second side of the first essentially planar coil winding not covered by the first lower pole piece.

5. The data storage system of claim 4 wherein the third shield also covers the first upper pole piece.

6. The data storage system of claim 5 wherein the fourth shield also covers the first lower pole piece.

7. The data storage system of claim 1 wherein the first and second shields each comprise:
an essentially planar layer of shield material which blocks electromagnetic radiation emanating from the first transducer.

8. The data storage system of claim 4 wherein the third and fourth shields each comprise:
an essentially planar layer of shield material which blocks electromagnetic radiation emanating from the first transducer.

9. The data storage system of claim 4 wherein the first, second, third and fourth shields each comprise:
a first essentially planar layer of magnetically permeable material; and
a second essentially planar layer of electrically conductive material.

10. The data storage system of claim 9 wherein the first, second, third and fourth shields are each in a range of approximately 5 to 10 microns thick.

11. The data storage system of claim 9 wherein the magnetically permeable material is an NiFe alloy.

12. The data storage system of claim 9 wherein the magnetically permeable material is NiFeCr.

13. The data storage system of claim 9 wherein the magnetically permeable material is FeCo.

14. The data storage system of claim 9 wherein the electrically conductive material is Cu.

15. The data storage system of claim 9 wherein the electrically conductive material is Ag.

16. The data storage system of claim 9 wherein the electrically conductive material is Au.

17. A data storage system, comprising:
a spindle;
a first magnetic disk mounted on the spindle for storing data;
a second magnetic disk mounted on the spindle for storing servo information;
a data head, positioned between the first and second magnetic disks and adjacent the first magnetic disk, the data head comprising:
a first slider; and
a first thin film transducer mounted on the first slider for writing data to and reading data from the first magnetic disk, the first thin film transducer comprising:
a first essentially planar coil winding having a center and first and second sides;
a first upper pole piece positioned along and covering a portion of the first side of the first essentially planar coil winding;
a first lower pole piece positioned along and covering a portion of the second side of the first essentially planar coil winding, the first lower pole piece joining the first upper pole piece at the center of the first essentially planar coil winding;
a first shield covering a portion of the first side of the first essentially planar coil winding not covered by the first upper pole piece; and
a second shield covering a portion of the second side of the first essentially planar coil winding not covered by the first lower pole piece; and
a servo head, positioned between the first and second magnetic disks and adjacent the second magnetic disk, for producing an output signal as a function of the servo information stored on the second magnetic disk, the servo head comprises:
a second slider; and
a second thin film transducer mounted on the second slider for reading servo information from the second disk, the second thin film transducer comprising:
a second essentially planar coil winding having a center and first and second sides;
a second upper pole piece positioned along and covering a portion of the first side of the second essentially planar coil winding; and
a second lower pole piece positioned along and covering a portion of the second side of the second essentially planar coil winding, the second lower pole piece joining the second upper pole piece at the center of the second essentially planar coil.

18. The data storage system of claim 17 wherein the first and second shields each comprise:
an essentially planar layer of shield material which blocks electromagnetic radiation emanating from the first transducer.

19. The data storage system of claim 18 wherein the shield material comprises:
a first layer of electrically conductive material; and
a second layer of magnetically permeable material.

20. The data storage system of claim 19 wherein the first and second shields are each approximately in the range of 5 to 10 microns thick.

21. The data storage system of claim 17 wherein the second thin film transducer of the servo head further comprises:
a third shield covering a portion of the first side of the second essentially planar coil winding not covered by the second upper pole piece; and
a fourth shield covering a portion of the second side of the second essentially planar coil winding not covered by the second lower pole piece.

* * * * *